(No Model.)
H. B. NICHOLS.
PIPE COUPLING.
No. 449,566. Patented Mar. 31, 1891.
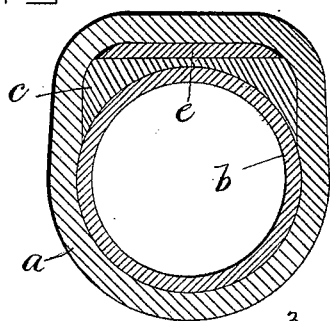
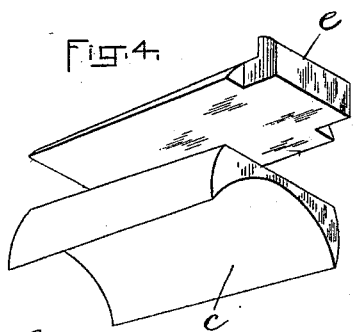
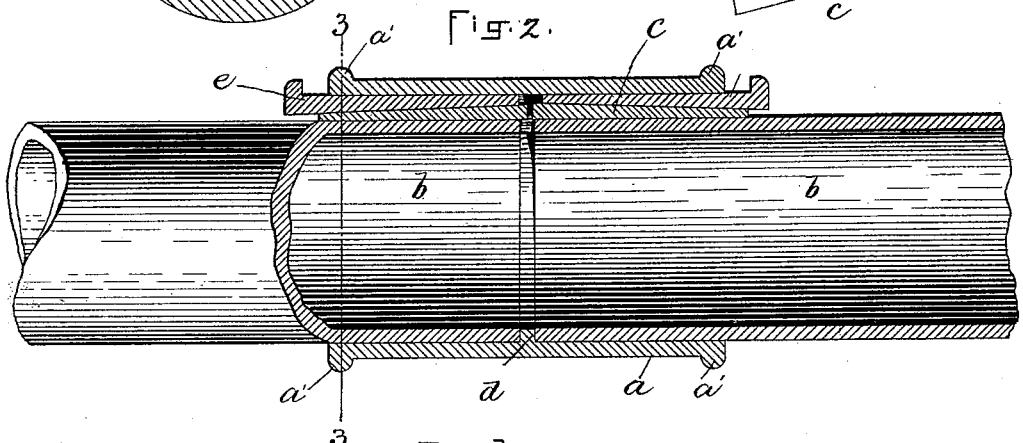
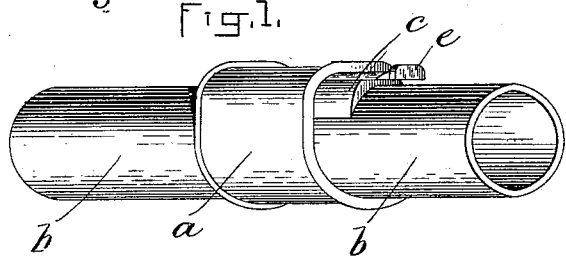
WITNESSES.
INVENTOR.
Henry Bert Nichols

UNITED STATES PATENT OFFICE.

HENRY BERT NICHOLS, OF BOSTON, MASSACHUSETTS, ASSIGNOR OF ONE-HALF TO JOHN W. LINZEE, JR., OF SAME PLACE.

PIPE-COUPLING.

SPECIFICATION forming part of Letters Patent No. 449,566, dated March 31, 1891.

Application filed June 18, 1890. Serial No. 355,835. (No model.)

*To all whom it may concern:*

Be it known that I, HENRY BERT NICHOLS, of Boston, in the county of Suffolk and State of Massachusetts, have invented certain new and useful Improvements in Pipe-Couplings, of which the following is a specification.

My invention has relation to conduit-pipes generally, and particularly to pipes of the kind designed for the reception of insulated electric wires.

It is the object of my invention to provide such improvements as will permit of the laying of conduit-pipes much more rapidly and economically than heretofore.

It is also the object of my invention to provide such improvements as will render the employment of skilled pipemen in the laying of the pipes entirely unnecessary.

It is also the object of my invention to provide such improvements as will permit of the laying of sections at points where it is quite impossible with existing contrivances to place conduit-pipes.

It is also the object of the invention to provide such improvements in conduit-pipes as will obviate the necessity of forming screw-threads upon and in the ends of the sections, as also the reaming of the ends down to a substantial knife-edge.

Reference is to be had to the accompanying drawings, and to the letters of reference marked thereon, forming a part of this specification, the same letters of reference indicating the same parts or features, as the case may be, wherever they occur.

In the said drawings, Figure 1 is a perspective view of two sections of pipe coupled in accordance with my improvements. Fig. 2 is a side view of the same on a somewhat larger scale, showing the coupling and adjunctive devices in section. Fig. 3 is a cross-section taken on the line 3 3 of Fig. 2. Fig. 4 is a perspective view of the wedge-block and wedge employed in my invention.

In carrying out my invention I provide a sleeve or collar $a$, which is adapted to fit closely over the pipe $b$ for a greater portion of the distance therearound, as is shown in Fig. 3, and is extended at its upper part, though it might as well be at its side part, so as to admit of the introduction between the pipe and the sleeve of a wedge-block $c$, which wedge-block is adapted to fit closely around the portion of the pipe not closely embraced by the sleeve or collar $a$. The collar $a$ is provided at a central point on its interior with a rib $d$ of a thickness corresponding substantially to the thickness of the pipe $b$, so that the ends of two sections of the pipe may be inserted into the opposite ends of the sleeve or collar $a$ and abut against the rib $d$, with the result of leaving the interior of the pipe practically smooth, and so that wires passed into the same will not catch against or be abraded by contact with the ends of the pipe. The rib $d$ serves as a means for centering the sleeve or collar $a$ upon the ends of two sections of pipe. The pipe being placed in position in the sleeve or collar $a$, as before stated, wedge-block $c$ may be placed in position between the collar and the pipe, as before stated, and wedges $e$ be driven in between the wedge-blocks and the collar, securing the collar in place upon the pipe. If it need be, red or white lead or similar substance may be introduced between the collar and pipe, and means for securing the parts in place to insure a perfectly water-tight joint. By the means described it will be seen that I obviate the necessity of screw-threading and reaming the ends of adjacent sections of the pipe in order to secure the same together and form a practically smooth interior surface, and that the need of employing the services of expert pipemen to screw the sections together is entirely obviated.

When the sleeve or collar $a$ is made of cast-iron, it may be made of the form shown in the drawings; but when it is made of wrought-iron the end ribs or flanges $a'$ may be dispensed with.

Having thus explained the nature of my invention, and described a way of constructing and using the same, I declare that what I claim is—

The herein-described means for connecting pipe-sections, consisting of the continuous sleeve or collar $a$, adapted to fit partially around the sections when brought end to end and provided with an internal rib or flange

*d*, extending around that portion of the interior of the sleeve or collar which fits upon the pipe-sections, and having its innermost edge or surface coincident with the interior surface of the pipe-sections, and means, substantially as described, including a wedge-block fitting around the portion of the exterior of the pipe not closely embraced by the collar and a wedge, both interposed between said sections and that part of the sleeve or collar which does not fit upon the outer surface of the pipe-sections for securing said collar upon said section, as set forth.

In testimony whereof I have signed my name to this specification, in the presence of two subscribing witnesses, this 24th day of May, A. D. 1890.

HENRY BERT NICHOLS.

Witnesses:
 EWING W. HAMLEN,
 ARTHUR W. CROSSLEY.